US012695523B2

(12) United States Patent (10) Patent No.: US 12,695,523 B2
Sun et al. (45) Date of Patent: Jul. 28, 2026

(54) CROSS-LINK INTERFERENCE REFERENCE SIGNAL RESOURCE POOL

(71) Applicant: QUALCOMM Incorporated, San Diego, CA (US)

(72) Inventors: Jing Sun, San Diego, CA (US); Yi Huang, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/448,949

(22) Filed: Aug. 13, 2023

(65) Prior Publication Data

US 2025/0055583 A1 Feb. 13, 2025

(51) Int. Cl.
H04B 17/345 (2015.01)
H04L 5/00 (2006.01)

(52) U.S. Cl.
CPC ......... H04B 17/345 (2015.01); H04L 5/0051 (2013.01)

(58) Field of Classification Search
CPC .... H04B 17/30; H04B 17/309; H04B 17/345; H04L 5/003; H04L 5/0048; H04L 5/0051; H04L 5/0057; H04W 24/10; H04W 72/04; H04W 72/044; H04W 72/0446
See application file for complete search history.

(56) References Cited

U.S. PATENT DOCUMENTS

| | | | |
|---|---|---|---|
| 2022/0014954 A1 | 1/2022 | Ibrahim et al. | |
| 2022/0159596 A1 | 5/2022 | Kim et al. | |

| | | | | |
|---|---|---|---|---|
| 2022/0312232 A1* | 9/2022 | Nam | ...................... | H04W 24/08 |
| 2022/0312504 A1 | 9/2022 | Zhang et al. | | |
| 2023/0125512 A1* | 4/2023 | Ibrahim | .................... | H04L 5/14 370/329 |
| 2023/0139197 A1* | 5/2023 | Zhang | ................ | H04W 72/542 370/329 |
| 2024/0214852 A1* | 6/2024 | Kiran | .................... | H04W 24/10 |
| 2024/0243824 A1* | 7/2024 | Lee | ...................... | H04B 17/345 |
| 2024/0413953 A1* | 12/2024 | Abotabl | ............... | H04L 5/0055 |

FOREIGN PATENT DOCUMENTS

| | | | | | |
|---|---|---|---|---|---|
| WO | WO-2023249380 A1 * | 12/2023 | | ............... | H04L 5/14 |

OTHER PUBLICATIONS

Catt, "Discussion on potential enhancements on dynamic/flexible TDD", May 22-26, 2023, 3GPP TSG RAN WG1 Meeting #113, R1-2304730, pp. 1-7 (Year: 2023).*
InterDigital, "On potential enhancements for dynamic/flexible TDD", May 22-May 26, 2023, 3GPP TSG RAN WG1 #113, R1-2304790, pp. 1-14 (Year: 2023).*

(Continued)

*Primary Examiner* — Paul H. Masur

(74) *Attorney, Agent, or Firm* — Patterson + Sheridan, L.L.P.

(57) ABSTRACT

Certain aspects of the present disclosure provide techniques for a resource pool for cross-link interference (CLI) reference signals (RSs). A method for wireless communications by a wireless node includes selecting one or more resources from at least one resource pool comprising a plurality of resources for CLI-RSs. The method includes outputting for transmission or monitoring for one or more CLI-RS on the one or more resources.

29 Claims, 9 Drawing Sheets

(56) References Cited

OTHER PUBLICATIONS

Ericsson, "Potential enhancements of dynamic TDD", May 22-26, 2023, 3GPP TSG-RAN WG1 Meeting #113, R1-2304793, pp. 1-8 (Year: 2023).*

Intel, "On dynamic/flexible TDD", May 22-May 26, 2023, 3GPP TSG RAN WG1 Meeting #113, R1-2304826, pp. 1-24 (Year: 2023).*

Apple, "Views on potential enhancements for dynamic TDD", May 22-26, 2023, 3GPP TSG RAN WG1 Meeting #113, R1-2305242, pp. 1-6 (Year: 2023).*

Samsung, "Dynamic and flexible TDD for NR duplex evolution", May 22-May 26, 2023, 3GPP TSG RAN WG1 Meeting #113, R1-2305513, pp. 1-8 (Year: 2023).*

Machine Translation of WO-2023249380-A1 (Year: 2023).*

Huawei., et al., "UL SRS Design for Beam Management and CSI Acquisition", R1-1709936, 3rd Generation Partnership Project, Mobile Competence Centre, 650, Route Des Lucioles, F-06921, Sophia-Antipolis Cedex, France, vol. RAN WG1, No. Qingdao, China, Jun. 27, 2017-Jun. 30, 2017, Jun. 17, 2017, pp. 1-8, XP051304676, 8 Pages, figures 1-4 sections 1, 2.1, 2.2.1, 2.2.3, 2.3.

Huawei., et al., "UL SRS Design for Beam Management and CSI Acquisition", R1-1712238, 3rd Generation Partnership Project, Mobile Competence Centre, 650, Route Des Lucioles, F-06921, Sophia-Antipolis Cedex, France, vol. RAN WG1, No. Prague, Czech Republic, Aug. 21, 2017-Aug. 25, 2017, Aug. 20, 2017, 12 Pages, XP051315055, figures 5-7 sections 1, 2.1, 2.1.1, 2.2.2.1, 2.2.3, 2.3.

International Search Report and Written Opinion—PCT/US2024/037544—ISA/EPO—Jan. 9, 2025.

LG Electronics: "CLI Configuration", R2-2008218, 3rd Generation Partnership Project, Mobile Competence Centre, 650, Route Des Lucioles, F-06921, Sophia-Antipolis Cedex, France, vol. RAN WG2, No. Electronic, Aug. 17, 2020-Aug. 28, 2020, Sep. 1, 2020, 19 Pages, XP052361309, sections 5.5.1, 6.3.2.

VIVO: "Potential Enhancements on Dynamic/flexible TDD", R1-2304479, 3rd Generation Partnership Project, Mobile Competence Centre, 650, Route Des Lucioles, F-06921, Sophia-Antipolis Cedex, France, vol. 3GPP RAN 1, No. Incheon, Korea, May 22, 2023-May 26, 2023, May 15, 2023, 9 pages, XP052385021, sections 2.1, 2.2.1, 2.3.3, 2.3.5, 2.4.

Moderator (ZTE): "Summary of [102-e-LS-Al5-05] Discussions for a Reply LS on Exchange of Information Related to SRS-RSRP Measurement Resource Configuration for UE-CLI", 3GPP TSG RAN WG1 #102-e, R1-2007293, 3rd Generation Partnership Project, Mobile Competence Centre, 650, Route Des Lucioles, F-06921 Sophia-Antipolis Cedex, France, vol. RAN WG1, No. E-Meeting, Aug. 17, 2020-Aug. 28, 2020, Aug. 27, 2020, pp. 1-9, XP052348661, table 2 section 1.

Nokia, et al., "UE CLI Measurement Configuration and Reporting", 3GPP TSG-RAN2#106, R2-1906637, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, 5 Pages, XP051730097, sections 1, 2.

Partial International Search Report—PCT/US2024/037544—ISA/EPO—Nov. 5, 2024.

Zte, et al., "NR Sidelink Physical Layer Structure", 3GPP TSG RAN WG1 #97, R1-1906457, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, pp. 1-12, XP051727907, sections 2.2, 2.2.1-2.2.3, 2.3.2, 2.4.1, 2.4.2.

* cited by examiner

600

A method for wireless communication at a user equipment (UE)

Select one or more resources from at least one resource pool comprising a plurality of resources for cross-link interference (CLI) reference signals (RS)

605

Output for transmission or monitoring for one or more CLI-RS on the one or more resources

610

700

A method for wireless communication by a network entity

Configure one or more user equipments (UEs) with at least one resource pool comprising a plurality of resources for at least one of: outputting for transmission or monitoring for cross-link interference (CLI) reference signals (RS)

705

Obtain a CLI measurement report from at least one of the one or more UEs

710

CROSS-LINK INTERFERENCE REFERENCE SIGNAL RESOURCE POOL

BACKGROUND

Field of the Disclosure

Aspects of the present disclosure relate to wireless communications, and more particularly, to techniques for communicating reference signals for cross-link interference measurement.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication at a wireless node. The method includes selecting one or more resources from at least one resource pool comprising a plurality of resources for cross-link interference (CLI) reference signals (RS); and outputting for transmission or monitoring for one or more CLI-RS on the one or more resources.

Another aspect provides a method for wireless communication by a network entity. The method includes configuring one or more wireless nodes with at least one resource pool comprising a plurality of resources for at least one of: outputting for transmission or monitoring for CLI-RS; and obtaining a CLI measurement report from at least one of the one or more UEs.

Other aspects provide: an apparatus operable, configured, or otherwise adapted to perform any one or more of the aforementioned methods and/or those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
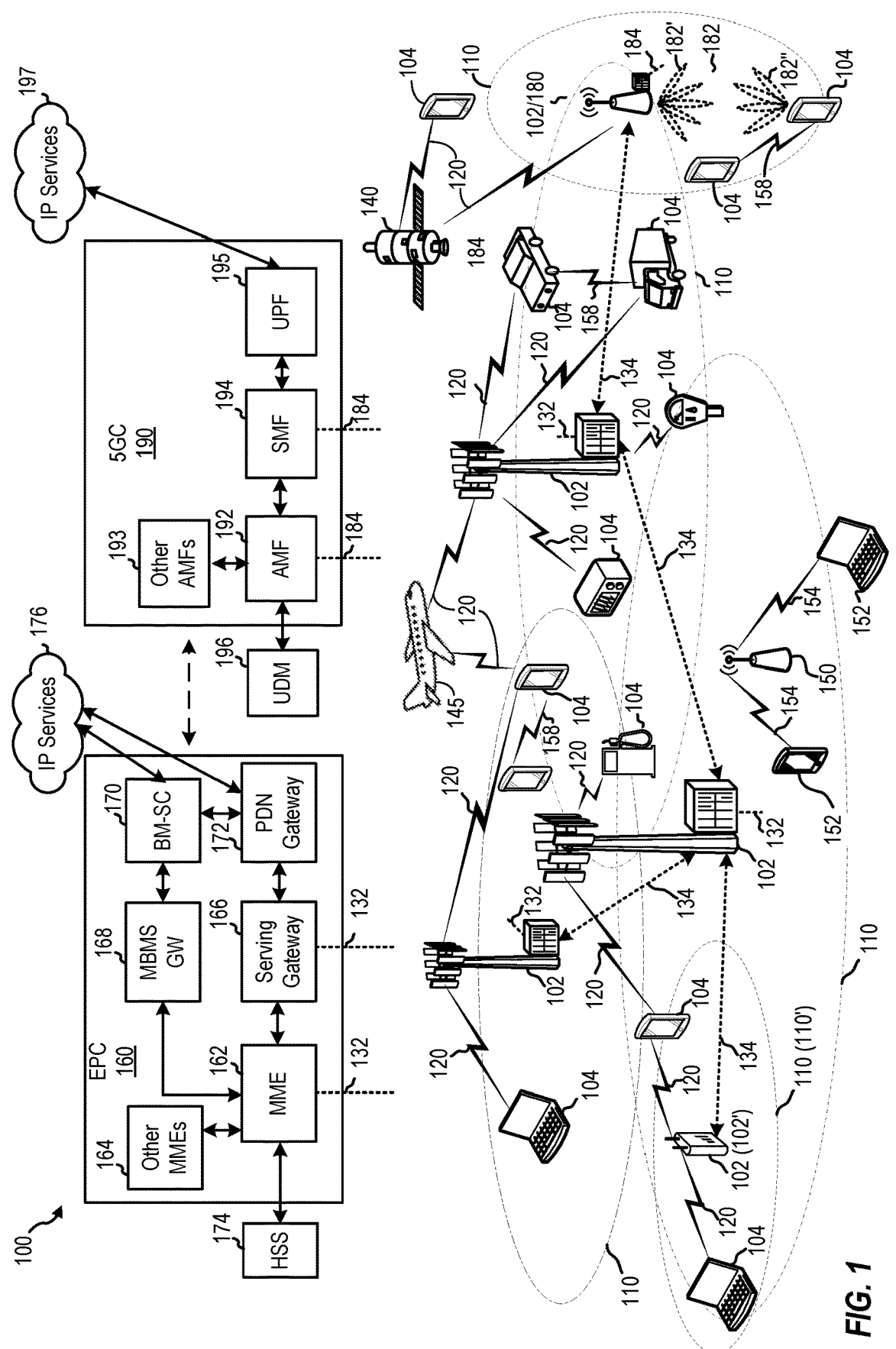
FIG. 1 depicts an example wireless communications network.

Aspects of the present disclosure provide apparatuses, methods, processing systems, and computer-readable mediums for communicating reference signals for cross-link interference.

In cellular communication between a network entity and a wireless node, simultaneous transmission and reception may be accomplished using different resources for uplink and downlink, for example using different frequencies (e.g., by frequency division duplexing (FDD)) or using different time resources (e.g., by time division duplexing (TDD)). TDD networks utilize the same bandwidth, but allocate different time slots for uplink and downlink. One drawback of TDD, however, is cross-link interference (CLI). CLI may occur where the devices interfere with each other as they transmit and receive in the same frequency band. Dynamic TDD allows devices to dynamically change the TDD uplink-downlink configuration leading to CLI.

CLI can be detected and managed based on measurements of reference signals. CLI can be between user equipments (UE-to-UE) or between base stations (BS-to-BS). For BS-to-BS CLI, a first BS transmits an RS and another BS measures the RS. Some backhaul signaling may be exchanged to coordinate the RS measurement.

For UE-to-UE CLI, the network may use a lot of overhead to carefully plan which UE transmits the RS and which UE monitors the RS, before making data scheduling decisions. For example, the BS may need to have a measurement at the first UE (UE1) of an RS transmitted by a second UE (UE0)

to determine the interference impact from UE0 to UE1 before the BS schedules the UE0 for uplink and the UE1 for downlink. In half duplex operation, the uplink scheduled for UE0 is to a first BS and the downlink scheduled for UE1 is from a second BS. Thus, for half duplex, cross site coordination is involved for to measure the CLI between UE0 and UE1 and schedule the uplink and downlink transmissions. In a distributed network entity, with split central unit (CU) and distributed units (DUs), a common CU may control two the BSs, making the coordination simpler. For full duplex (e.g., using multiple antenna panels), identifying the source of CLI may be difficult in the case of many UEs.

According, techniques are needed to reduce the overhead of CLI measurement, simplify the configuration of CLI measurement, provide accurate CLI measurement, and allow simple processing that does not require additional hardware.

Aspects of the disclosure introduce a resource pool for CLI reference signals (CLI-RS). Wireless nodes can be configured with the resource pool, or multiple resource pools, and configured with how to select resources from the CLI-RS resource pool to utilize for transmitting or monitoring CLI-RS.

In some aspects, a common CLI-RS resource pool is configured for selecting resources for transmitting CLI-RS and for selecting resources for monitoring CLI-RS. In some aspects, separate CLI-RS resource pools are configured for selecting resources for transmitting CLI-RS and for selecting resources for monitoring CLI-RS.

In some aspects, a CLI-RS resource pool is a pool of resources configured (e.g., dedicated/reserved for) CLI-RS. In some aspects, a CLI-RS resource pool is periodic. In some aspects, multiple CLI-RS resource pools are configured. In some aspects, a CLI-RS resource pool includes time, frequency, and code resources.

In some aspects, a wireless node is configured to select multiple resource from the CLI-RS resource pool for processing gain, different transmit ports, and/or different transmit power levels.

In some aspects, the wireless node is configured to select resources from the CLI-RS resource pool for CLI-RS transmission based on a fixed allocation. In some aspects, the wireless node is configured to select resources from the CLI-RS resource pool for CLI-RS transmission based on a resource utilization pattern. In some aspects, the wireless node is configured to decide the resources to select from the CLI-RS resource pool for CLI-RS transmission.

In some aspects, the wireless node is configured to select resources from the CLI-RS resource pool for CLI-RS monitoring based on a fixed allocation. In some aspects, the wireless node is configured to select resources from the CLI-RS resource pool for CLI-RS monitoring based on a resource utilization pattern. In some aspects, the wireless node is configured to decide the resources to select from the CLI-RS resource pool for CLI-RS monitoring.

In some aspects, the wireless nodes may use any combination of fixed allocation, resource utilization pattern, and wireless node decision for selection of CLI-RS resources from the CLI-RS resource pool for transmission and monitoring. In some aspects, the same approach is used for selection of CLI-RS resources from the CLI-RS resource pool for transmission as for monitoring. In some aspects, different approaches are used for selection of CLI-RS resources from the CLI-RS resource pool for transmission than for monitoring.

In some aspects, resources from the CLI-RS resource pool selected for transmission of CLI-RS that are not used for transmitting CLI-RS can be used for monitoring CLI-RS.

In some aspects, the CLI-RS resource pool techniques described herein may provide efficient use of resources and efficient measurement, joint configuration across wireless nodes, and flexibility for transmitting and measurement CLI-RS.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
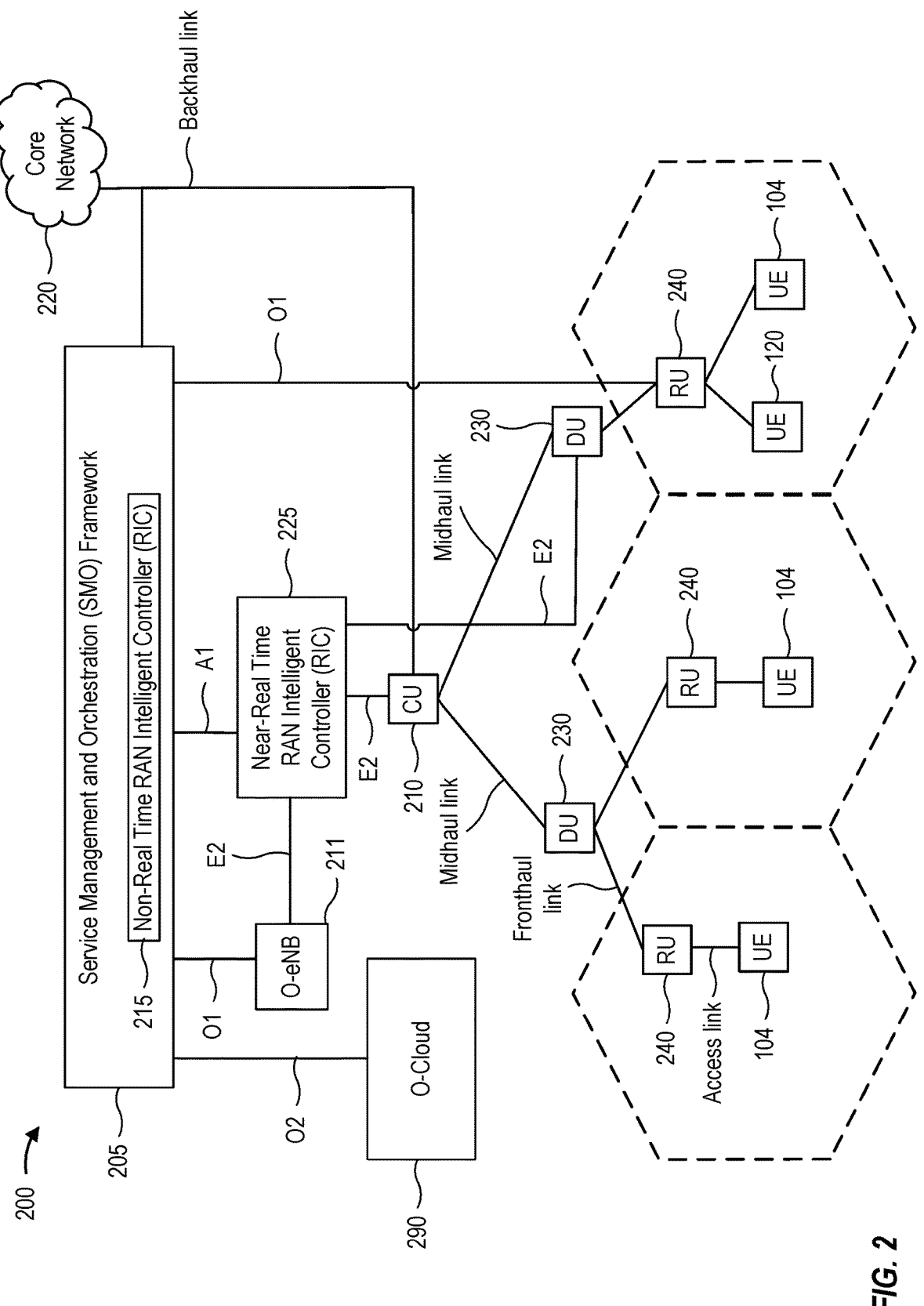
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-71,000

MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182' BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHZ and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
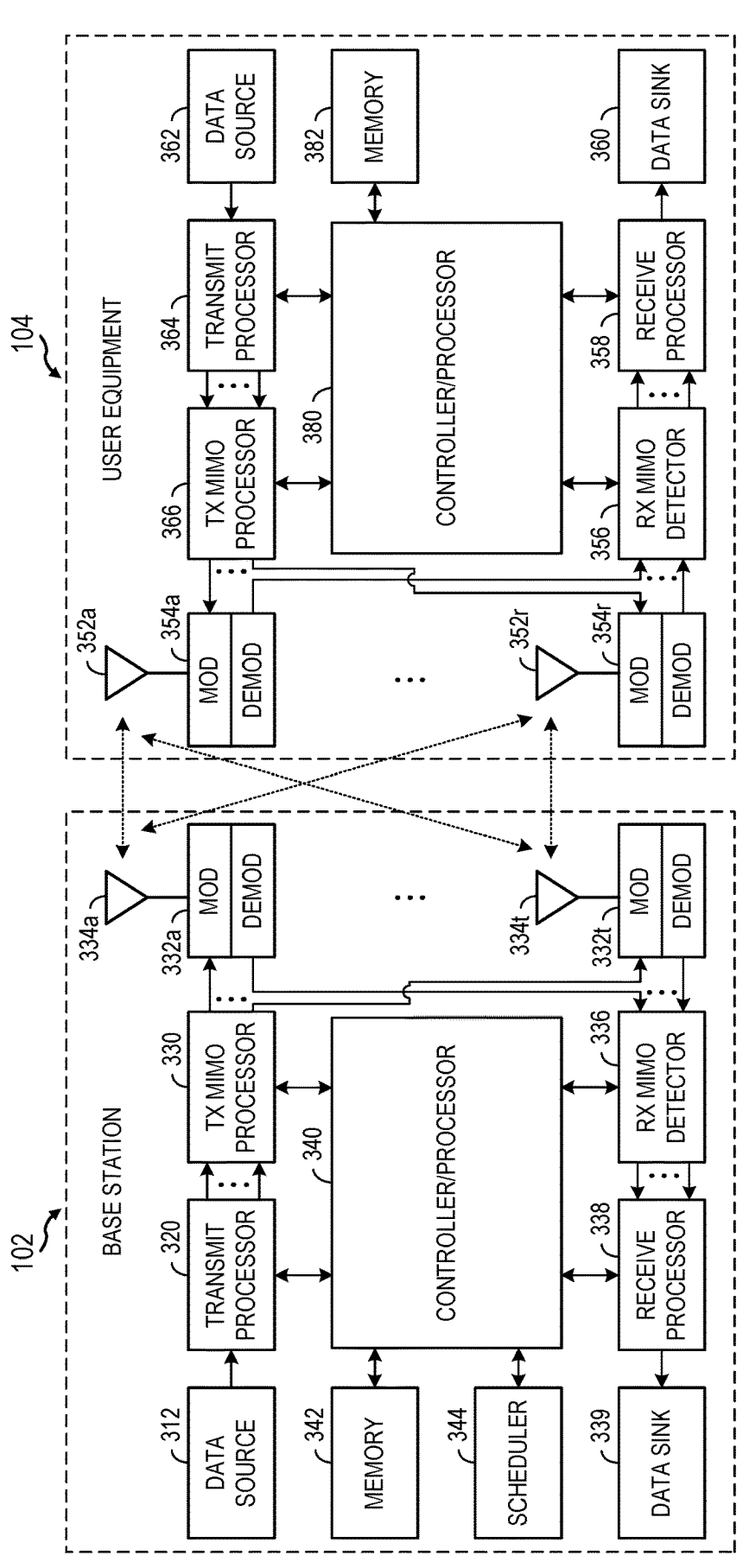
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
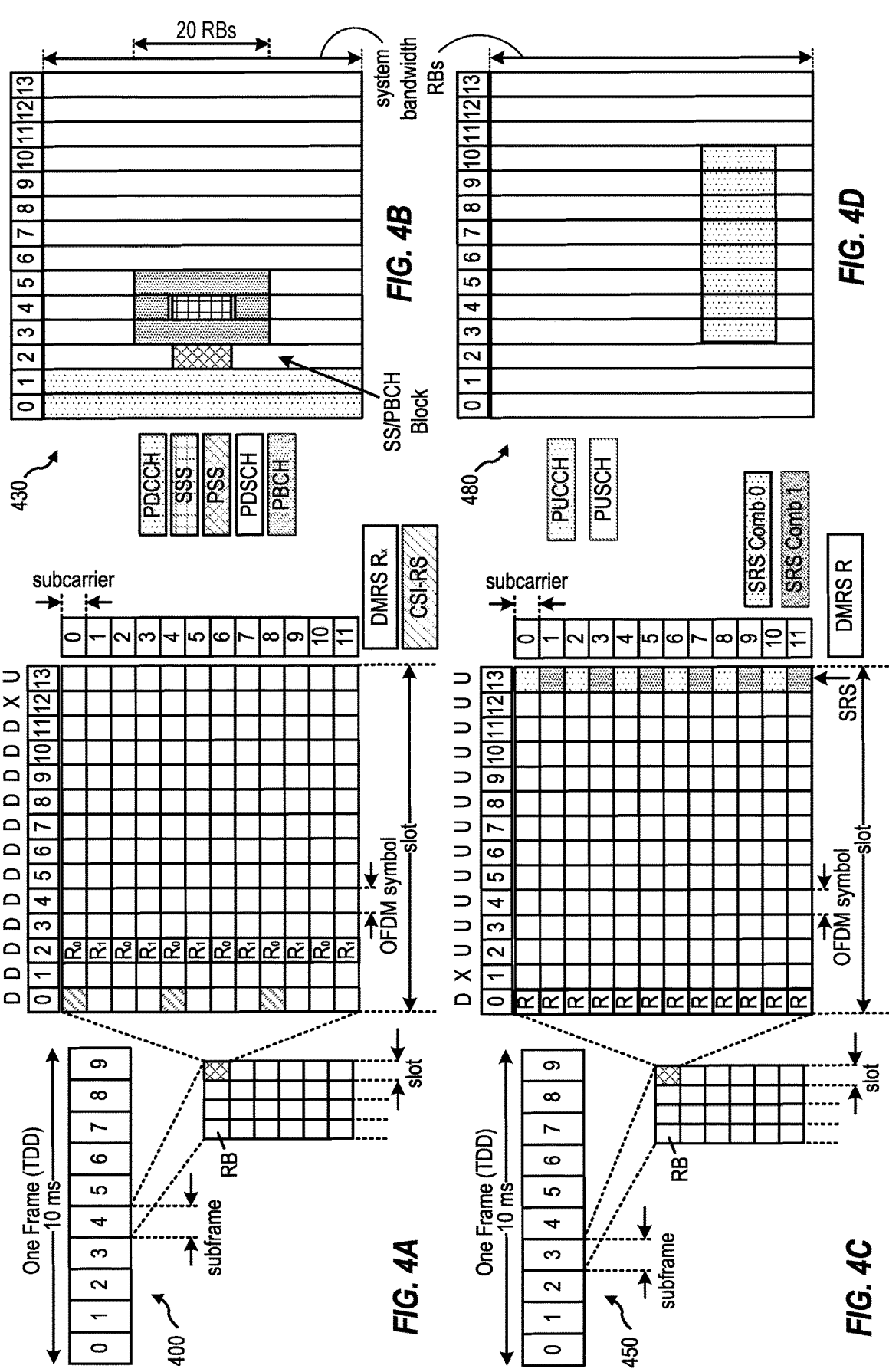
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^4 \times 15$ kHz, where $\mu$ is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Cross-Link Interference Reference Signal Resource Pool

Aspects of the disclosure introduce a resource pool for CLI-RS. According to certain aspects, wireless nodes are configured with at least one CLI-RS resource pool and configured with how to select resources from the CLI-RS resource pool to utilize for transmitting and/or monitoring CLI-RS.

While certain aspects of the disclosure are described with respect to UE-to-UE CLI. It should be understood that the techniques described herein can also be applied to a CLI-RS resource pool for BS-to-BS CLI.

Figure 5:
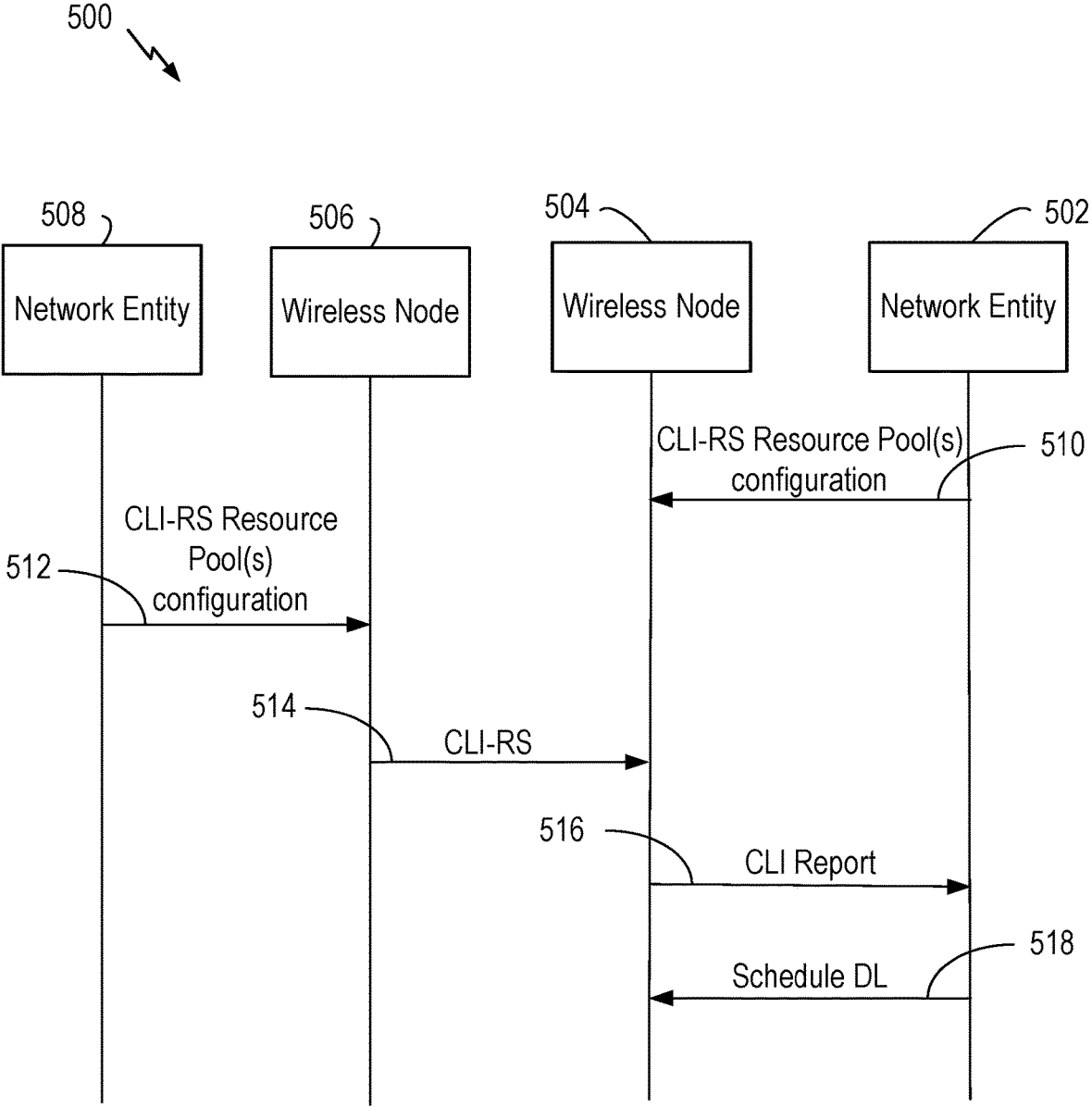
FIG. 5 depicts a process flow for communications in a network between network entities and wireless nodes.

FIG. 5 depicts a process flow 500 for communications in a network between a first network entity 502, a first wireless node 504, a second wireless node 506, and a second network entity 508. In some aspects, the first network entity 502 and/or the second network entity 508 may be an example of a BS 102 depicted and described with respect to FIGS. 1 and 3 or a disaggregated base station depicted and described with respect to FIG. 2. Similarly, the first wireless node 504 and/or the second wireless node 506 may be an example of a UE 104 depicted and described with respect to FIGS. 1 and 3. However, in other aspects, wireless nodes 504 and 506 may be another type of wireless communications device and network entities 502 and 508 may be another type of network entity or network node, such as those described herein.

As shown in FIG. 5, at step 510, first network entity 502 configures wireless node 504 with a CLI-RS resource pool configuration. At step 512, second network entity 508 configures the second wireless node 506 with a CLI-RS resource pool configuration. In some aspects, the CLI-RS resource pool configuration is scheduled via semi-static radio resource control (RRC) signaling, medium access control (MAC) control element (CE) signaling, broadcast system information, and/or in downlink control information (DCI).

Although in FIG. 5, the CLI-RS resource pool configuration is signaled by the network entities to the wireless nodes, in some aspects the CLI-RS resource configuration may be preconfigured at the wireless nodes.

Although in FIG. 5, the CLI-RS resource pool configuration of a wireless node is shown signaled in a single step, in some aspects the CLI-RS resource configuration may signaled in multiple steps.

Further, although in FIG. 5, the network entities 502 and 508 are shown separately, in some aspects the network entities 502 and 508 may be distributed units (DUs) controlled by a single central unit (CU).

Also, although in FIG. 5, the first wireless node 504 receives the CLI-RS resource pool configuration at step 510 before the second wireless node 506 receives the CLI-RS resource pool configuration at step 512, it should be understood that the wireless nodes 504 and 506 may be configured with the CLI-RS resource configuration at the same time or the second wireless node 506 may be configured before the first wireless node 504.

In addition, although in FIG. 5, two wireless nodes and two network entities are depicted, it should be understood that any number of wireless nodes and network entities may be present in the network and perform the techniques described herein.

In some aspects, the CLI-RS resource pool configuration at steps 510 and 512 configures one or more CLI-RS resource pools and configures the UE with how to select resources from the one or more CLI-RS resource pools. In some aspects, the CLI-RS resource pool configuration configures one or more CLI-RS resource pools and the UE is preconfigured with how to select resources from the one or more CLI-RS resource pools. Thus, different than individually configuring RS resources for the wireless nodes to use for CLI-RS, the wireless nodes instead are configured with the one or more CLI-RS resources and how to select resources from the CLI-RS resource pool.

In some aspects, a CLI-RS resource pool is a pool of resources configured (e.g., dedicated/reserved for) CLI-RS. In some aspects, a CLI-RS resource pool includes CLI-RS resources that are continuous in time and frequency. In some aspects, a CLI-RS resource pool includes time (e.g. one or more OFDM symbols), frequency (e.g., one or more comb interlaces), and code (e.g., a root and cyclic shift) resources.

In some aspects, the CLI-RS resource pool configuration at steps 510 and 512 configures periodic CLI-RS resource pool. For example, the same CLI-RS resource pool resources may be configured with a period and offset in time.

In some aspects, the CLI-RS resource pool configuration at steps 510 and 512 configures multiple CLI-RS resource pools. The wireless nodes 504 and 506 may use different CLI-RS resource pools at different times.

In some aspects, the CLI-RS resource pool configuration at steps 510 and 512 configures a common CLI-RS resource pool for CLI-RS transmission and for CLI-RS monitoring. In some aspects, the CLI-RS resource pool configuration at steps 510 and 512 configures separate CLI-RS resource pools for CLI-RS transmission and for CLI-RS monitoring.

In some aspects, the CLI-RS resource pool configuration at steps 510 and 512 configures the wireless nodes 504 and 506 to select multiple resource from a CLI-RS resource pool for processing gain (e.g., by repeating CLI-RS on multiple symbols), different transmit ports (e.g., associated with different resource groups), and/or different transmit power levels.

At step 514, the second wireless node 506 transmits CLI-RS to the first wireless node 504 using CLI-RS resources selected based on the CLI-RS resource pool configuration received at step 512 and the first wireless node 504 monitors CLI-RS on CLI-RS resources based on the CLI-RS resource pool configuration received at step 510.

According to certain aspects, the CLI-RS comprises a sounding reference signal (SRS) waveform.

In some aspects, the CLI-RS resource pool configuration at steps 510 and 512 configures the wireless nodes 504 and

506 to select resources from the CLI-RS resource pool for CLI-RS transmission based on a fixed allocation. With a fixed allocation, the network entity configures the resources within the CLI-RS resource pool for the wireless node to select for CLI-RS transmission. In some aspects, the network entity indicates the resources for the wireless node to select for CLI-RS in the CLI-RS resource pool configuration or in separate signaling. In some aspects, a resource assignment by the network entity to the wireless node for transmitting CLI-RS may be indicated in the context of the CLI-RS resource pool. For example, the network entity may indicate a symbol, interlace, code index, cyclic shift index, or the like from within the CLI-RS resource pool.

In some aspects, the network entity can configure group hopping for the selection of CLI-RS resources from the CLI-RS resource pool for CLI-RS transmission. The grouping may allow wireless nodes to discovery more other wireless nodes over time.

A fixed allocation may provide full control to the network entity to allocate the CLI-RS resources from the CLI-RS resource pool used by the wireless node. This approach may enable the network entity to reduce and/or avoid collisions. For example, the network entity may orthogonalize different resource usages by the wireless nodes.

Randomness in the selection of the resources from the CLI-RS resource pool for CLI-RS transmission may help reduce the chance of a persistent collision.

In some aspects, the CLI-RS resource pool configuration at steps 510 and 512 configures the wireless nodes 504 and 506 to select resources from the CLI-RS resource pool for CLI-RS transmission based on a resource utilization pattern. In some aspects, the network entity configures the resource utilization pattern in the CLI-RS resource pool configuration or in separate signaling from the CLI-RS resource pool configuration. In some aspects, the resource utilization pattern is wireless node specific (e.g., based on a UE ID). The resource utilization pattern may introduce some randomness to the resource selection from the CLI-RS resource pool for CLI-RS transmission. In some aspects, the resource utilization pattern is a random seed. In some aspects, the selection of resources from the CLI-RS resource pool is uniformly random.

In some aspects, the CLI-RS resource pool configuration at steps 510 and 512 configures the wireless nodes 504 and 506 to decide the resources to select from the CLI-RS resource pool for CLI-RS transmission. In some aspects, it is up to the wireless node to choose the resources to select from the CLI-RS resource pool for CLI-RS transmission. In some aspects, the network entity configures a subset of resources from the CLI-RS resource pool and the wireless node chooses the resources from the subset of resources of the CLI-RS resource pool for CLI-RS transmission. In some aspects, the wireless node chooses the resources randomly (e.g., uniformly randomly) from the CLI-RS resource pool for CLI-RS transmission. In some aspects, the wireless node selects the resources from the CLI-RS resource pool for CLI-RS transmission based on a preference of the wireless node. In some aspects, the wireless reports the resource selected from the CLI-RS resource pool for CLI-RS transmission back to the network entity. In some aspects, this allows the network entity to combine the received resource information with a CLI report from a victim wireless node to find out which link is causing CLI to the victim wireless node.

In some aspects, the CLI-RS resource pool configuration at steps 510 and 512 configures the wireless nodes 504 and 506 to select resources from the CLI-RS resource pool for CLI-RS monitoring based on a fixed allocation. With a fixed allocation, the network entity configures the resources within the CLI-RS resource pool for the wireless node to select for CLI-RS monitoring. In some aspects, the network entity indicates the resources for the wireless node to select for CLI-RS in the CLI-RS resource pool configuration or in separate signaling. In some aspects, a resource assignment by the network entity to the wireless node for monitoring CLI-RS may be indicated in the context of the CLI-RS resource pool. For example, the network entity may indicate a symbol, interlace, code index, cyclic shift index, or the like from within the CLI-RS resource pool. In some aspects, the network entity takes care to provide the fixed allocation such that a wireless node is not configured to transmit and monitor CLI-RS at the same time (e.g., and may further account for an uplink-downlink switching time). In some aspects, the wireless node is configured (e.g., by the network entity or preconfigured) with a priority rule to resolve whether to transmit or monitor CLI-RS if the wireless node is configured to both at the same time. In some aspects, the number of resources that the wireless node can measure is based on a capability of the wireless node, which may be reported to the network entity. The network entity may configure the fixed allocated based on the reported capability of the wireless node (e.g., to avoid configuring the wireless node to monitor more resources than it is capable of for CLI-RS).

In some aspects, the network entity can configure group hopping for the selection of CLI-RS resources from the CLI-RS resource pool for CLI-RS monitoring. The grouping may allow wireless nodes to discovery more other wireless nodes over time.

A fixed allocation may provide full control to the network entity to allocate the CLI-RS resources from the CLI-RS resource pool used by the wireless node. This approach may enable the network entity to reduce and/or avoid collisions. For example, the network entity may orthogonalize different resource usages by the wireless nodes.

Randomness in the selection of the resources from the CLI-RS resource pool for CLI-RS monitoring may help reduce the chance of a persistent collision.

In some aspects, the CLI-RS resource pool configuration at steps 510 and 512 configures the wireless nodes 504 and 506 to select resources from the CLI-RS resource pool for CLI-RS monitoring based on a resource utilization pattern. In some aspects, the network entity configures the resource utilization pattern in the CLI-RS resource pool configuration or in separate signaling from the CLI-RS resource pool configuration. In some aspects, the resource utilization pattern is wireless node specific (e.g., based on a UE ID). The resource utilization pattern may introduce some randomness to the resource selection from the CLI-RS resource pool for CLI-RS monitoring. In some aspects, the resource utilization pattern is a random seed. In some aspects, the selection of resources from the CLI-RS resource pool is uniformly random.

In some aspects, the CLI-RS resource pool configuration at steps 510 and 512 configures the wireless nodes 504 and 506 to decide the resources to select from the CLI-RS resource pool for CLI-RS monitoring. In some aspects, it is up to the wireless node to choose the resources to select from the CLI-RS resource pool for CLI-RS monitoring. In some aspects, the network entity configures a subset of resources from the CLI-RS resource pool and the wireless node chooses the resources from the subset of resources of the CLI-RS resource pool for CLI-RS monitoring. In some aspects, the wireless node chooses the resources randomly (e.g., uniformly randomly) from the CLI-RS resource pool for CLI-RS monitoring. In some aspects, the wireless node selects the resources from the CLI-RS resource pool for CLI-RS monitoring based on a preference of the wireless node. In some aspects, the wireless reports the resource selected from the CLI-RS resource pool for CLI-RS monitoring back to the network entity. In some aspects, this allows the network entity to combine the received resource information with a CLI report from a victim wireless node to find out which link is causing CLI to the victim wireless node.

It should be understood that any of the techniques described above for selecting the resources from the CLI-RS resource pool for CLI-RS transmission may be used in combination with any of the techniques described above for selecting the resources from the CLI-RS resource pool for CLI-RS monitoring.

At step 516, the first wireless node 504 transmit a CLI report to the first network entity 502. In some aspects, the CLI report includes measurement results of the CLI-RS received at step 514. In some aspects, after measuring the CLI-RS resources, the wireless node determines which resources are occupied, which resource has dominant interference, and reports the dominant interference.

In some aspects, the first network entity 504 makes scheduling decisions based on the CLI report received at step 516 (and/or based on other CLI reports received from other wireless nodes and/or reported from another network entity over a backhaul). At step 518, the first network entity 504 schedules the first wireless node 504 for a downlink transmission. In some aspects, the first network entity 502 estimates CLI caused by an uplink transmission by the second wireless node 506 to the downlink transmission scheduled for the first wireless node 504 and schedules the first wireless node 504 for the downlink transmission at step 518 based on the estimated CLI. Although not shown in FIG. 5, in some aspects, the first network entity 502 may exchange information over a backhaul with the second network entity 508, such as the CLI-RS measurements, the estimated CLI, and/or scheduling information of the wireless nodes. In some aspects, based on the exchanged information, the second network entity 508 may configure the second wireless node 506 for a TDD uplink transmission concurrent with the downlink transmission scheduled for the first wireless node 504.

In some aspects, resources from the CLI-RS resource pool selected for transmission of CLI-RS that are not used for transmitting CLI-RS can be used for monitoring CLI-RS.

In some aspects, the wireless nodes may be configured with a priority or dropping rule to resolve collisions between resources selected for CLI-RS transmission and CLI-RS monitoring. For example, the wireless node may deprioritize resources selected using a UE controlled approach (e.g., UE decides the resources selected from the CLI-RS resource pool) over resources selected based on more control from the network entity (e.g., based on the fixed allocated or resource utilization pattern).

Example Operations of a Wireless Node

Figure 6:
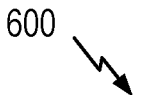
FIG. 6 depicts a method for wireless communications by a wireless node.
Figure 6:
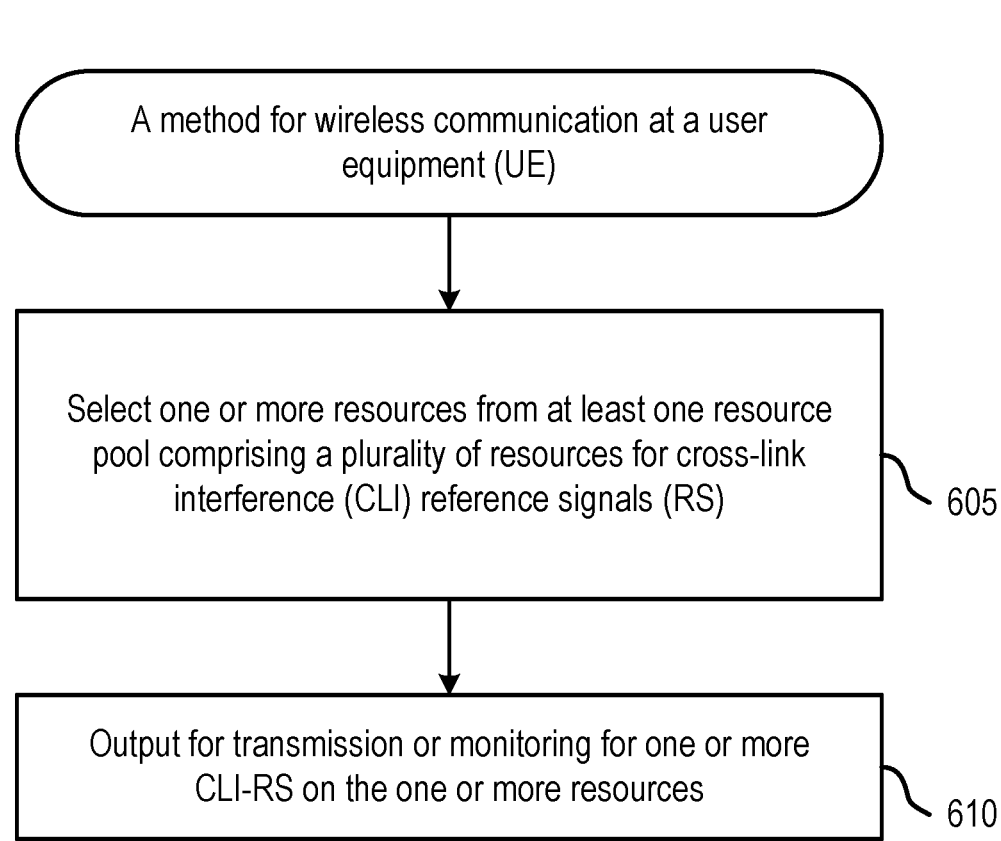

FIG. 6 shows an example of a method 600 of wireless communication at a wireless node, such as a UE 104 of FIGS. 1 and 3.

Method 600 begins at step 605 with selecting one or more resources from at least one resource pool comprising a plurality of resources for cross-link interference (CLI) reference signals (RS). In some cases, the operations of this step refer to, or may be performed by, circuitry for selecting and/or code for selecting as described with reference to FIG. 8.

Method 600 then proceeds to step 610 with outputting for transmission or monitoring for one or more CLI-RS on the one or more resources. In some cases, the operations of this step refer to, or may be performed by, circuitry for outputting and/or code for outputting as described with reference to FIG. 8.

In some aspects, the plurality of resources are continuous in time and frequency.

In some aspects, at least one of: the at least one resource pool is periodic; or the resource pool is configured with at least one of a period or an offset.

In some aspects, the one or more resources are selected from different resource pools of the at least one resource pool and at different times.

In some aspects, the selection of the one or more resources from the at least one resource pool comprises selecting at least one of: one or more symbols, a frequency comb interlace, or a code.

In some aspects, the output comprises outputting the one or more CLI-RS on the one or more resources.

In some aspects, each of the one or more CLI-RS are output for transmission as a sounding reference signal (SRS) waveform; or the monitoring comprises monitoring for an SRS waveform as the one or more CLI-RS.

In some aspects, the selection of the one or more resources from the at least one resource pool comprises selecting multiple resources from the at least one resource pool; and the output comprises at least one of: repeating the CLI-RS on the multiple resources, outputting the CLI-RS for transmission via different transmit ports on the multiple resources, or outputting the CLI-RS for transmission using different transmit power levels on the multiple resources.

In some aspects, the method 600 further includes obtaining signaling indicating the one or more resources from the at least one resource pool, wherein the selection of the one or more resources from the at least one resource pool comprises selecting the indicated one or more resources from the at least one resource pool. In some cases, the operations of this step refer to, or may be performed by, circuitry for obtaining and/or code for obtaining as described with reference to FIG. 8.

In some aspects, the signaling further indicates at least one of: one or more symbols, one or more frequency comb interlaces, one or more code index, or one or one or more cyclic shift index from the at least one resource pool.

In some aspects, the method 600 further includes obtaining signaling configuring the UE with a resource hopping pattern to hop resources for outputting for transmission or monitoring for the one or more CLI-RS. In some cases, the operations of this step refer to, or may be performed by, circuitry for obtaining and/or code for obtaining as described with reference to FIG. 8.

In some aspects, the selection of the one or more resources from the at least one resource pool comprises selecting the one or more resources from the at least one resource pool based on a resource selection pattern.

In some aspects, the selection of the one or more resources from the at least one resource pool based on the configured resource selection pattern comprises randomly selecting the one or more resources from the at least one resource pool based on a seed.

In some aspects, the method 600 further includes obtaining signaling indicating the resource selection pattern for selecting the one or more resources from the at least one resource pool. In some cases, the operations of this step refer to, or may be performed by, circuitry for obtaining and/or code for obtaining as described with reference to FIG. 8.

In some aspects, the method 600 further includes obtaining signaling indicating a subset of the plurality of resources of the at least one resource pool, wherein the one or more resources are selected from the subset of resources. In some cases, the operations of this step refer to, or may be performed by, circuitry for obtaining and/or code for obtaining as described with reference to FIG. 8.

In some aspects, the selection comprises: randomly selecting the one or more resources from the at least one resource pool; or selecting the one or more resources from the at least one resource pool based on a preference of the wireless node.

In some aspects, the method 600 further includes outputting an indication of the one or more resources. In some cases, the operations of this step refer to, or may be performed by, circuitry for outputting and/or code for outputting as described with reference to FIG. 8.

In some aspects, the selection of the one or more resources from the at least one resource pool comprises selecting first one or more resources from a first resource pool for outputting for transmission or monitoring for first one or more CLI-RS and selecting second one or more resources from a second resource pool for outputting for transmission or monitoring for second one or more CLI-RS monitoring, the second resource pool being different from the first resource pool.

In some aspects, the at least one resource pool comprises a common resource pool.

In some aspects, the outputting or the monitoring comprises monitoring the one or more CLI-RS on the one or more resources.

In some aspects, the method 600 further includes measuring the one or more CLI-RS. In some cases, the operations of this step refer to, or may be performed by, circuitry for measuring and/or code for measuring as described with reference to FIG. 8.

In some aspects, the method 600 further includes reporting the one or more measurements to a network entity. In some cases, the operations of this step refer to, or may be performed by, circuitry for reporting and/or code for reporting as described with reference to FIG. 8.

In some aspects, the report comprises only measurements of a dominant interferer to the network entity.

In some aspects, the selection of the one or more resources from the at least one resource pool comprises: selecting a first one or more resources from the at least one resource pool for outputting for transmission first one or more CLI-RS; and selecting a second one or more resources from the at least one resource pool to select for monitoring for second one or more CLI-RS.

In some aspects, the method 600 further includes monitoring for the second one or more CLI-RS in resources of the first one or more resources unused by the wireless node for outputting for transmission the first one or more CLI-RS. In some cases, the operations of this step refer to, or may be performed by, circuitry for monitoring and/or code for monitoring as described with reference to FIG. 8.

In some aspects, the first one or more resources and the second one or more resources overlap, further comprising determining to use the overlapping resources for outputting for transmission or for monitoring CLI-RS based on a priority or a rule.

In some aspects, the determination to use the overlapping resources for outputting CLI-RS or for monitoring CLI-RS based on the priority comprises prioritizing resources configured by a network entity for outputting for transmission or monitoring for CLI-RS over resources decided by the wireless node for outputting or monitoring CLI-RS.

In some aspects, the method 600 further includes obtaining signaling configuring the wireless node for dynamic time division duplexing (TDD). In some cases, the operations of this step refer to, or may be performed by, circuitry for obtaining and/or code for obtaining as described with reference to FIG. 8.

Figure 8:
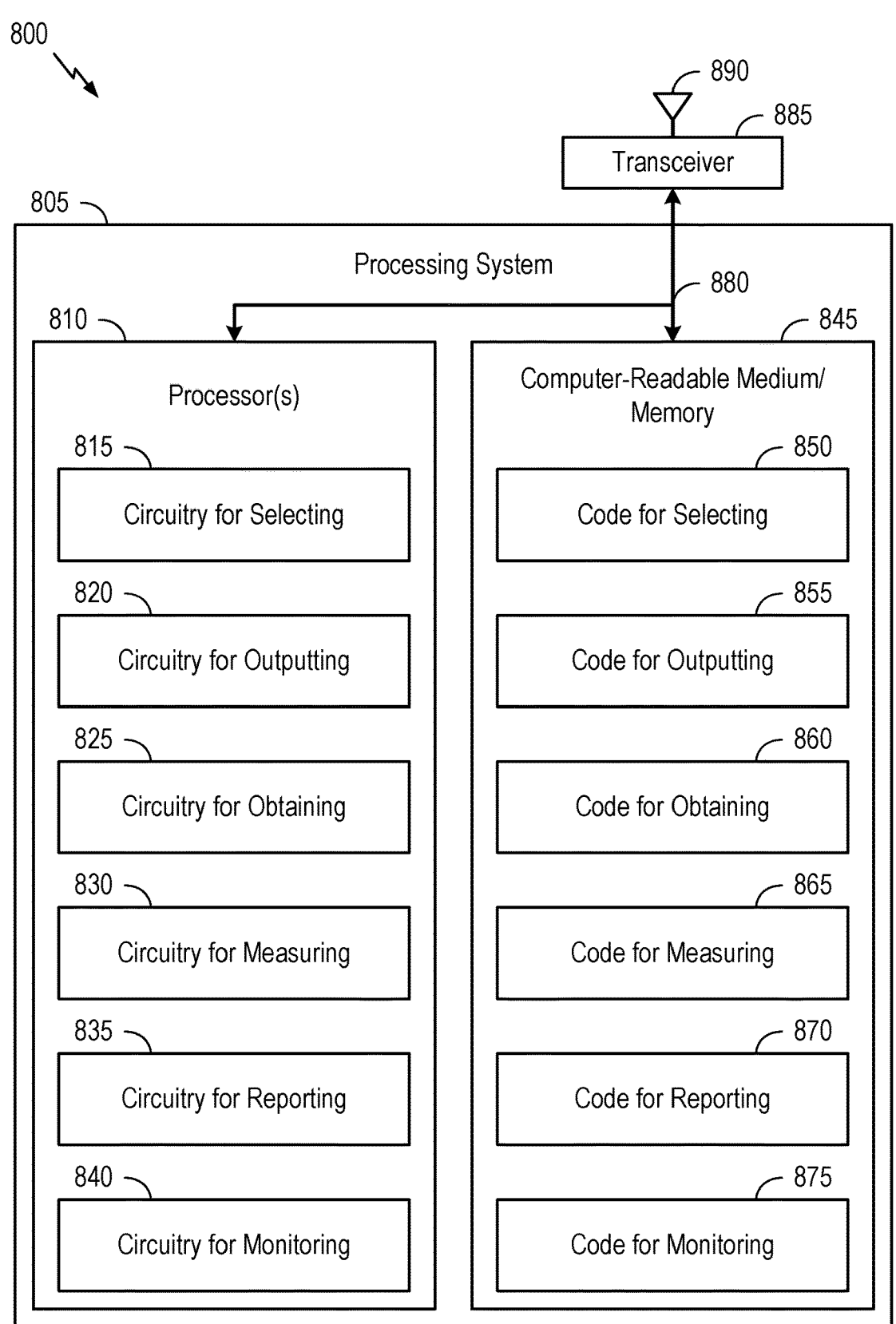
FIG. 8 depicts aspects of an example communications device.

In one aspect, method 600, or any aspect related to it, may be performed by an apparatus, such as communications device 800 of FIG. 8, which includes various components operable, configured, or adapted to perform the method 600. Communications device 800 is described below in further detail.

Note that FIG. 6 is just one example of a method, and other methods including fewer, additional, or alternative steps are possible consistent with this disclosure.

Example Operations of a Network Entity

Figure 7:
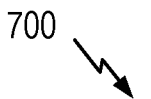
FIG. 7 depicts a method for wireless communications by a network entity.
Figure 7:
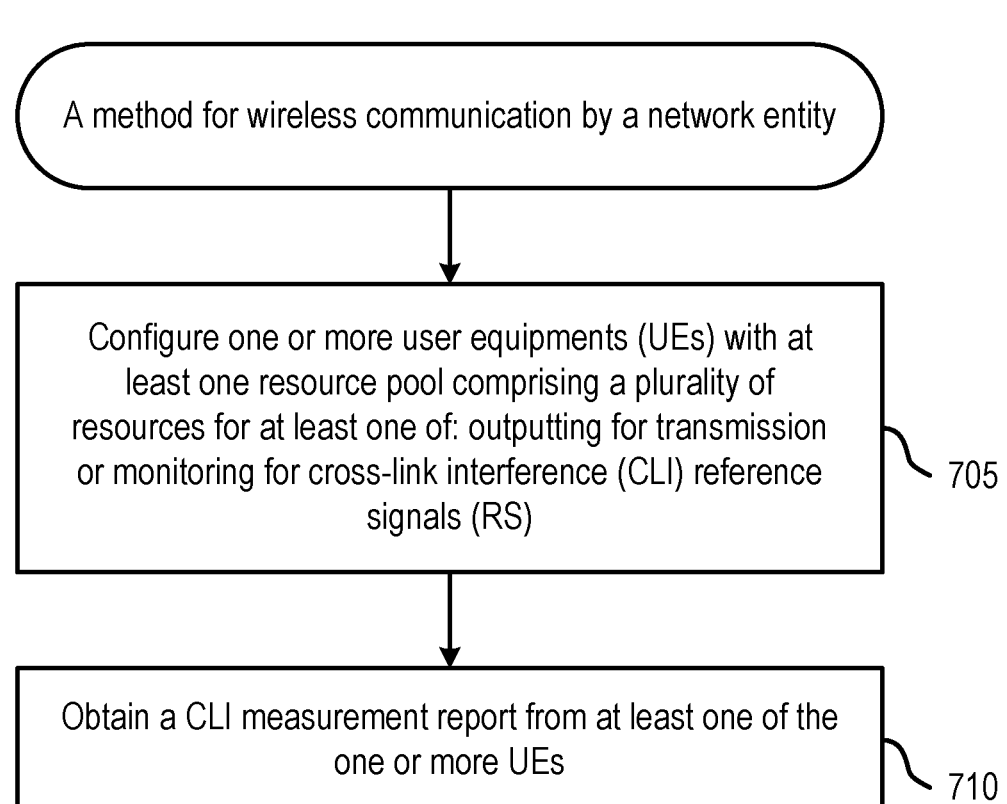

FIG. 7 shows an example of a method 700 of wireless communication by a network entity, such as a BS 102 of FIGS. 1 and 3, or a disaggregated base station as discussed with respect to FIG. 2.

Method 700 begins at step 705 with configuring one or more wireless nodes with at least one resource pool comprising a plurality of resources for at least one of: outputting for transmission or monitoring for cross-link interference (CLI) reference signals (RS). In some cases, the operations of this step refer to, or may be performed by, circuitry for configuring and/or code for configuring as described with reference to FIG. 9.

Method 700 then proceeds to step 710 with obtaining a CLI measurement report from at least one of the one or more wireless nodes. In some cases, the operations of this step refer to, or may be performed by, circuitry for outputting and/or code for outputting as described with reference to FIG. 9.

In some aspects, the plurality of resources are continuous in time and frequency.

In some aspects, at least one of: the at least one resource pool is periodic; or the resource pool is configured with at least one of a period or an offset.

In some aspects, the one or more resources are selected from different resource pools of the at least one resource pool and at different times.

In some aspects, the method 700 further comprises configuring the one or more wireless nodes to select the one or more resources from the at least one resource pool comprises selecting at least one of: one or more symbols, a frequency comb interlace, or a code.

In some aspects, the method 700 further comprises configuring the one or more wireless nodes to select multiple resources from the at least one resource pool for at least one of: repeating the CLI-RS on the multiple resources, outputting the CLI-RS for transmission via different transmit ports on the multiple resources, or outputting the CLI-RS for transmission using different transmit power levels on the multiple resources.

In some aspects, the method 700 further includes outputting signaling indicating the one or more resources from the at least one resource pool, wherein the selection of the one or more resources from the at least one resource pool is the indicated one or more resources from the at least one resource pool. In some cases, the operations of this step refer to, or may be performed by, circuitry for outputting and/or code for outputting as described with reference to FIG. 9.

In some aspects, the signaling further indicates at least one of: one or more symbols, one or more frequency comb interlaces, one or more code index, or one or one or more cyclic shift index from the at least one resource pool.

In some aspects, the method 700 further includes outputting signaling configuring the UE with a resource hopping pattern to hop resources for outputting for transmission or monitoring for the one or more CLI-RS. In some cases, the operations of this step refer to, or may be performed by, circuitry for outputting and/or code for outputting as described with reference to FIG. 9.

In some aspects, the method 700 further comprises configuring the one or more wireless nodes to select the one or more resources from the at least one resource pool by selecting the one or more resources from the at least one resource pool based on a resource selection pattern.

In some aspects, the method 700 further comprises configuring the one or more wireless nodes to select the one or more resources from the at least one resource pool based on the configured resource selection pattern by randomly selecting the one or more resources from the at least one resource pool based on a seed.

In some aspects, the method 700 further includes outputting signaling indicating the resource selection pattern for selecting the one or more resources from the at least one resource pool. In some cases, the operations of this step refer to, or may be performed by, circuitry for outputting and/or code for outputting as described with reference to FIG. 9.

In some aspects, the method 700 further includes outputting signaling indicating a subset of the plurality of resources of the at least one resource pool, wherein the one or more resources are selected from the subset of resources. In some cases, the operations of this step refer to, or may be performed by, circuitry for outputting and/or code for outputting as described with reference to FIG. 9.

In some aspects, the method 700 further comprises configuring the one or more wireless nodes to randomly select the one or more resources from the at least one resource pool; or select the one or more resources from the at least one resource pool based on a preference of the wireless node.

In some aspects, the method 700 further includes obtaining an indication of the one or more resources. In some cases, the operations of this step refer to, or may be performed by, circuitry for obtaining and/or code for obtaining as described with reference to FIG. 9.

In some aspects, the method 700 further comprises configuring the one or more wireless nodes to select the one or more resources from the at least one resource pool by selecting first one or more resources from a first resource pool for outputting for transmission or monitoring for first one or more CLI-RS and selecting second one or more resources from a second resource pool for outputting for transmission or monitoring for second one or more CLI-RS monitoring, the second resource pool being different from the first resource pool.

In some aspects, the at least one resource pool comprises a common resource pool.

In some aspects, the CLI report comprises only measurements of a dominant interferer to the network entity.

In some aspects, the method 700 further comprises configuring the one or more wireless nodes to select a first one or more resources from the at least one resource pool for outputting for transmission first one or more CLI-RS; and outputting for transmission first one or more CLI-RS; and select a second one or more resources from the at least one resource pool to select for monitoring for second one or more CLI-RS.

In some aspects, the method 700 further comprises configuring the one or more wireless nodes a priority or a rule to select to use the overlapping resources for outputting for transmission or for monitoring CLI-RS.

In some aspects, the priority comprises prioritizing resources configured by a network entity for outputting for transmission or monitoring for CLI-RS over resources decided by the wireless node for outputting or monitoring CLI-RS.

In some aspects, the method 700 further includes outputting signaling configuring the one or more wireless nodes for dynamic time division duplexing (TDD). In some cases, the operations of this step refer to, or may be performed by, circuitry for outputting and/or code for outputting as described with reference to FIG. 9.

Figure 9:
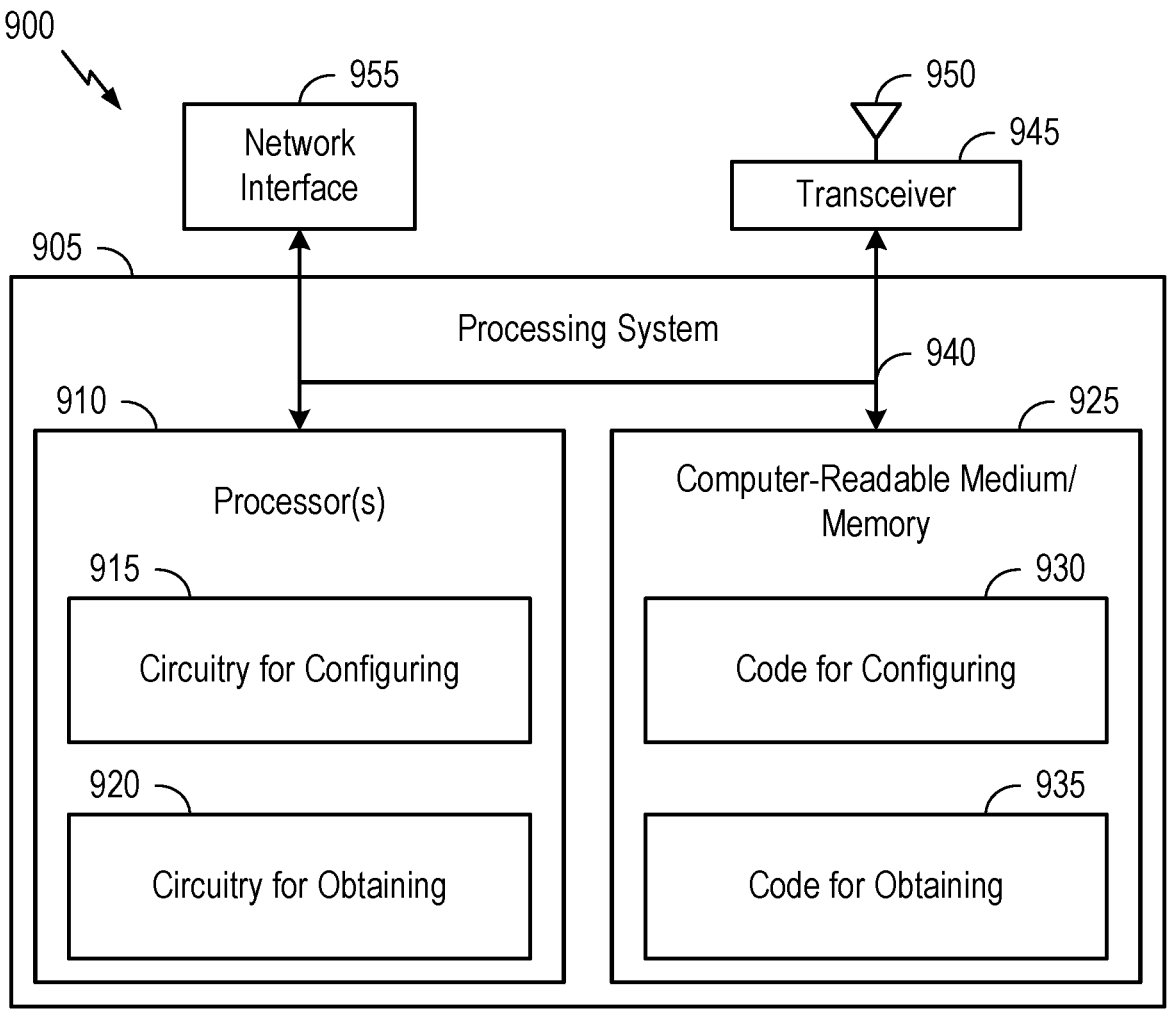
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700.

Communications device 900 is described below in further detail.

Note that FIG. 7 is just one example of a method, and other methods including fewer, additional, or alternative steps are possible consistent with this disclosure.

Example Communications Devices

FIG. 8 depicts aspects of an example communications device 800. In some aspects, communications device 800 is a user equipment, such as UE 104 described above with respect to FIGS. 1 and 3.

The communications device 800 includes a processing system 805 coupled to the transceiver 885 (e.g., a transmitter and/or a receiver). The transceiver 885 is configured to transmit and receive signals for the communications device 800 via the antenna 890, such as the various signals as described herein. The processing system 805 may be configured to perform processing functions for the communications device 800, including processing signals received and/or to be transmitted by the communications device 800.

The processing system 805 includes one or more processors 810. In various aspects, the one or more processors 810 may be representative of one or more of receive processor 358, transmit processor 364, TX MIMO processor 366, and/or controller/processor 380, as described with respect to FIG. 3. The one or more processors 810 are coupled to a computer-readable medium/memory 845 via a bus 880. In certain aspects, the computer-readable medium/memory 845 is configured to store instructions (e.g., computer-executable code) that when executed by the one or more processors 810, cause the one or more processors 810 to perform the method 600 described with respect to FIG. 6, or any aspect related to it. Note that reference to a processor performing a function of communications device 800 may include one or more processors 810 performing that function of communications device 800.

In the depicted example, computer-readable medium/memory 845 stores code (e.g., executable instructions), such as code for selecting 850, code for outputting 855, code for obtaining 860, code for measuring 865, code for reporting 870, and code for monitoring 875. Processing of the code for selecting 850, code for outputting 855, code for obtaining 860, code for measuring 865, code for reporting 870, and code for monitoring 875 may cause the communications device 800 to perform the method 600 described with respect to FIG. 6, or any aspect related to it.

The one or more processors 810 include circuitry configured to implement (e.g., execute) the code stored in the computer-readable medium/memory 845, including circuitry such as circuitry for selecting 815, circuitry for outputting 820, circuitry for obtaining 825, circuitry for measuring 830, circuitry for reporting 835, and circuitry for monitoring 840. Processing with circuitry for selecting 815, circuitry for outputting 820, circuitry for obtaining 825, circuitry for measuring 830, circuitry for reporting 835, and circuitry for monitoring 840 may cause the communications device 800 to perform the method 600 described with respect to FIG. 6, or any aspect related to it.

Various components of the communications device 800 may provide means for performing the method 600 described with respect to FIG. 6, or any aspect related to it. For example, means for transmitting, sending, reporting, repeating, or outputting for transmission may include transceivers 354 and/or antenna(s) 352 of the UE 104 illustrated in FIG. 3 and/or the transceiver 885 and the antenna 890 of the communications device 800 in FIG. 8. Means for receiving, monitoring, measuring, or obtaining may include transceivers 354 and/or antenna(s) 352 of the UE 104 illustrated in FIG. 3 and/or the transceiver 885 and the antenna 890 of the communications device 800 in FIG. 8. Means for selecting, determining, or prioritizing may include controller/processor 340 of the UE 104 illustrated in FIG. 3 and/or the circuitry for selecting 815 of the communications device 800 in FIG. 8.

FIG. 9 depicts aspects of an example communications device 900. In some aspects, communications device 900 is a network entity, such as BS 102 of FIGS. 1 and 3, or a disaggregated base station as discussed with respect to FIG. 2.

The communications device 900 includes a processing system 905 coupled to the transceiver 945 (e.g., a transmitter and/or a receiver) and/or a network interface 955. The transceiver 945 is configured to transmit and receive signals for the communications device 900 via the antenna 950, such as the various signals as described herein. The network interface 955 is configured to obtain and send signals for the communications device 900 via communication link(s), such as a backhaul link, midhaul link, and/or fronthaul link as described herein, such as with respect to FIG. 2. The processing system 905 may be configured to perform processing functions for the communications device 900, including processing signals received and/or to be transmitted by the communications device 900.

The processing system 905 includes one or more processors 910. In various aspects, one or more processors 910 may be representative of one or more of receive processor 338, transmit processor 320, TX MIMO processor 330, and/or controller/processor 340, as described with respect to FIG. 3. The one or more processors 910 are coupled to a computer-readable medium/memory 925 via a bus 940. In certain aspects, the computer-readable medium/memory 925 is configured to store instructions (e.g., computer-executable code) that when executed by the one or more processors 910, cause the one or more processors 910 to perform the method 700 described with respect to FIG. 7, or any aspect related to it. Note that reference to a processor of communications device 900 performing a function may include one or more processors 910 of communications device 900 performing that function.

In the depicted example, the computer-readable medium/memory 925 stores code (e.g., executable instructions), such as code for configuring 930 and code for obtaining 935. Processing of the code for configuring 930 and code for obtaining 935 may cause the communications device 900 to perform the method 700 described with respect to FIG. 7, or any aspect related to it.

The one or more processors 910 include circuitry configured to implement (e.g., execute) the code stored in the computer-readable medium/memory 925, including circuitry such as circuitry for configuring 915 and circuitry for obtaining 920. Processing with circuitry for configuring 915 and circuitry for obtaining 920 may cause the communications device 900 to perform the method 700 described with respect to FIG. 7, or any aspect related to it.

Various components of the communications device 900 may provide means for performing the method 700 described with respect to FIG. 7, or any aspect related to it. Means for configuring, transmitting, sending or outputting for transmission may include transceivers 332 and/or antenna(s) 334 of the BS 102 illustrated in FIG. 3 and/or the transceiver 945 and the antenna 950 of the communications device 900 in FIG. 9. Means for receiving or obtaining may include transceivers 332 and/or antenna(s) 334 of the BS 102 illustrated in FIG. 3 and/or the transceiver 945 and the antenna 950 of the communications device 900 in FIG. 9.

Example Clauses

Implementation examples are described in the following numbered clauses:

Clause 1: A method for wireless communication at a user equipment (UE), the method comprising: selecting one or more resources from at least one resource pool comprising a plurality of resources for cross-link interference (CLI) reference signals (RS); and outputting for transmission or monitoring for one or more CLI-RS on the one or more resources.

Clause 2: The method of Clause 1, wherein the plurality of resources are continuous in time and frequency.

Clause 3: The method of any combination of Clauses 1-2, wherein at least one of: the at least one resource pool is periodic; or the resource pool is configured with at least one of a period or an offset.

Clause 4: The method of any combination of Clauses 1-3, wherein the one or more resources are selected from different resource pools of the at least one resource pool and at different times.

Clause 5: The method of any combination of Clauses 1-4, wherein the selection of the one or more resources from the at least one resource pool comprises selecting at least one of: one or more symbols, a frequency comb interlace, or a code.

Clause 6: The method of any combination of Clauses 1-5, wherein the output comprises outputting the one or more CLI-RS on the one or more resources.

Clause 7: The method of any combination of Clauses 1-6, wherein: each of the one or more CLI-RS is output for transmission as a sounding reference signal (SRS) waveform; or the monitoring comprises monitoring for an SRS waveform as the one or more CLI-RS.

Clause 8: The method of any combination of Clauses 1-7, wherein: the selection of the one or more resources from the at least one resource pool comprises selecting multiple resources from the at least one resource pool; and the output comprises at least one of: repeating the CLI-RS on the multiple resources, outputting the CLI-RS for transmission via different transmit ports on the multiple resources, or outputting the CLI-RS for transmission using different transmit power levels on the multiple resources.

Clause 9: The method of any combination of Clauses 1-8, further comprising obtaining signaling indicating the one or more resources from the at least one resource pool, wherein the selection of the one or more resources from the at least one resource pool comprises selecting the indicated one or more resources from the at least one resource pool.

Clause 10: The method of Clause 9, wherein the signaling further indicates at least one of: one or more symbols, one or more frequency comb interlaces, one or more code index, or one or one or more cyclic shift index from the at least one resource pool.

Clause 11: The method of any combination of Clauses 1-10, further comprising obtaining signaling configuring the UE with a resource hopping pattern, wherein outputting for transmission or monitoring comprises hopping resources for outputting for transmission or monitoring for the one or more CLI-RS.

Clause 12: The method of any combination of Clauses 1-11, wherein the selection of the one or more resources from the at least one resource pool comprises selecting the one or more resources from the at least one resource pool based on a resource selection pattern.

Clause 13: The method of Clause 12, wherein the selection of the one or more resources from the at least one resource pool based on the configured resource selection pattern comprises randomly selecting the one or more resources from the at least one resource pool based on a seed.

Clause 14: The method of any combination of Clauses 12-13, further comprising obtaining signaling indicating the resource selection pattern for selecting the one or more resources from the at least one resource pool.

Clause 15: The method of any combination of Clauses 1-14, further comprising obtaining signaling indicating a subset of the plurality of resources of the at least one resource pool, wherein the one or more resources are selected from the subset of resources.

Clause 16: The method of any combination of Clauses 1-15, the selection comprises: randomly selecting the one or more resources from the at least one resource pool; or selecting the one or more resources from the at least one resource pool based on a preference of the UE.

Clause 17: The method of any combination of Clauses 1-16, further comprising outputting an indication of the one or more resources.

Clause 18: The method of any combination of Clauses 1-17, wherein the selection of the one or more resources from the at least one resource pool comprises selecting first one or more resources from a first resource pool for outputting for transmission or monitoring for first one or more CLI-RS and selecting second one or more resources from a second resource pool for outputting for transmission or monitoring for second one or more CLI-RS monitoring, the second resource pool being different from the first resource pool.

Clause 19: The method of any combination of Clauses 1-18, wherein the at least one resource pool comprises a common resource pool.

Clause 20: The method of any combination of Clauses 1-19, wherein the outputting or the monitoring comprises monitoring the one or more CLI-RS on the one or more resources.

Clause 21: The method of Clause 20, further comprising: measuring the one or more CLI-RS; and reporting the one or more measurements to a network entity.

Clause 22: The method of Clause 21, wherein the report comprises only measurements of a dominant interferer to the network entity.

Clause 23: The method of any combination of Clauses 1-22, wherein the selection of the one or more resources from the at least one resource pool comprises: selecting a first one or more resources from the at least one resource pool for outputting for transmission first one or more CLI-RS; and selecting a second one or more resources from the at least one resource pool to select for monitoring for second one or more CLI-RS.

Clause 24: The method of Clause 23, further comprising monitoring for the second one or more CLI-RS in resources of the first one or more resources unused by the UE for outputting for transmission the first one or more CLI-RS.

Clause 25: The method of any combination of Clauses 23-24, wherein the first one or more resources and the second one or more resources overlap, further comprising determining to use the overlapping resources for outputting for transmission or for monitoring CLI-RS based on a priority or a rule.

Clause 26: The method of Clause 25, wherein the determination to use the overlapping resources for outputting CLI-RS or for monitoring CLI-RS based on the priority comprises prioritizing resources configured by a network entity for outputting for transmission or monitoring for CLI-RS over resources decided by the UE for outputting or monitoring CLI-RS.

Clause 27: The method of any combination of Clauses 1-26, further comprising obtaining signaling configuring the UE for dynamic time division duplexing (TDD).

Clause 28: A method for wireless communication by a network entity, the method comprising: configuring one or more user equipments (UEs) with at least one resource pool comprising a plurality of resources for at least one of: outputting for transmission or monitoring for cross-link interference (CLI) reference signals (RS); and obtaining a CLI measurement report from at least one of the one or more UEs.

Clause 29: The method of Clause 28, wherein the plurality of resources are continuous in time and frequency.

Clause 30: The method of any combination of Clauses 28-29, wherein at least one of: the at least one resource pool is periodic; or the resource pool is configured with at least one of a period or an offset.

Clause 31: The method of any combination of Clauses 28-30, wherein the configuring configures the UE to select one or more resources from different resource pools of the at least one resource pool and at different times.

Clause 32: The method of any combination of Clauses 28-31, wherein the configuring configures the UE to select one or more symbols, a frequency comb interlace, or a code from the resource pool.

Clause 33: The method of any combination of Clauses 28-32, wherein the configuring configures the UE to output for transmission or monitor one or more CLI-RS as a sounding reference signal (SRS) waveform.

Clause 34: The method of any combination of Clauses 28-33, wherein the configuring configures the UE to select multiple resources from the at least one resource pool for at least one of: repeating the CLI-RS on the multiple resources, outputting the CLI-RS for transmission via different transmit ports on the multiple resources, or outputting the CLI-RS for transmission using different transmit power levels on the multiple resources.

Clause 35: The method of any combination of Clauses 28-34, further comprising outputting signaling indicating the one or more resources to select from the at least one resource pool.

Clause 36: The method of Clause 35, wherein the signaling further indicates at least one of: one or more symbols, one or more frequency comb interlaces, one or more code index, or one or one or more cyclic shift index from the at least one resource pool.

Clause 37: The method of any combination of Clauses 28-36, further comprising outputting signaling configuring the UE with a resource hopping pattern for outputting for transmission or monitoring the one or more CLI-RS.

Clause 38: The method of any combination of Clauses 28-37, wherein the configuring configures the UE to select the one or more resources from the at least one resource pool based on a resource selection pattern.

Clause 39: The method of Clause 38, wherein the configuring configures the UE to randomly select the one or more resources from the at least one resource pool based on a seed.

Clause 40: The method of any combination of Clauses 38-39, further comprising outputting signaling indicating the resource selection pattern for selecting the one or more resources from the at least one resource pool.

Clause 41: The method of any combination of Clauses 28-40, further comprising outputting signaling indicating a subset of the plurality of resources of the at least one resource pool for selection of the one or more resources.

Clause 42: The method of any combination of Clauses 28-41, wherein the configuring configures the UE to randomly select the one or more resources from the at least one resource pool; or to select the one or more resources from the at least one resource pool based on a preference of the UE.

Clause 43: The method of any combination of Clauses 28-42, further comprising obtaining an indication of the one or more resources.

Clause 44: The method of any combination of Clauses 28-43, wherein the configuring configures the UE to select first one or more resources from a first resource pool for outputting for transmission or monitoring for first one or more CLI-RS and select second one or more resources from a second resource pool for outputting for transmission or monitoring for second one or more CLI-RS monitoring, the second resource pool being different from the first resource pool.

Clause 45: The method of any combination of Clauses 28-44, wherein the at least one resource pool comprises a common resource pool.

Clause 46: The method of any combination of Clauses 28-45, wherein the CLI measurement report comprises only measurements of a dominant interferer.

Clause 47: The method of any combination of Clauses 28-46, wherein the configuring configures the UE to select a first one or more resources from the at least one resource pool for outputting for transmission first one or more CLI-RS and to select a second one or more resources from the at least one resource pool to select for monitoring for second one or more CLI-RS.

Clause 48: The method of Clause 47, wherein the configuring configures the UE to select the one or more CLI-RS resources to monitor for the second one or more CLI-RS in resources of the first one or more resources unused by the UE for outputting for transmission the first one or more CLI-RS.

Clause 49: The method of any combination of Clauses 47-48, wherein the first one or more resources and the second one or more resources overlap, wherein the configuring configures the UE to use the overlapping resources for outputting for transmission or for monitoring CLI-RS based on a priority or a rule.

Clause 50: The method of Clause 49, wherein the configuring configures the UE to prioritize resources configured by a network entity for outputting for transmission or monitoring for CLI-RS over resources decided by the UE for outputting or monitoring CLI-RS.

Clause 51: The method of any combination of Clauses 28-50, further comprising outputting signaling configuring the UE for dynamic time division duplexing (TDD).

Clause 52: An apparatus, comprising: a memory comprising executable instructions; and one or more processors configured to execute the executable instructions and cause the apparatus to perform a method in accordance with any one of Clauses 1-51.

Clause 53: An apparatus, comprising means for performing a method in accordance with any one of Clauses 1-51.

Clause 54: A non-transitory computer-readable medium comprising executable instructions that, when executed by one or more processors of an apparatus, cause the apparatus to perform a method in accordance with any one of Clauses 1-51.

Clause 55: A computer program product embodied on a computer-readable storage medium comprising code for performing a method in accordance with any one of Clauses 1-51.

Clause 56: A wireless node, comprising: at least one transceiver; a memory comprising instructions; and one or more processors configured to execute the instructions and cause the wireless node to perform a method in accordance with any one of Clauses 1-27.

Clause 57: A network entity, comprising: at least one transceiver; a memory comprising instructions; and one or more processors configured to execute the instructions and cause the network entity to perform a method in accordance with any one of Clauses 28-51

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
at least one transceiver;
at least one memory comprising computer-executable instructions; and
one or more processors configured to execute the computer-executable instructions to cause the apparatus to:
select one or more resources from at least one resource pool comprising a plurality of resources for cross-link interference (CLI) reference signals (RS); and
transmit, via the at least one transceiver, or monitor for, via the at least one transceiver, one or more CLI-RS on the one or more resources, wherein:
the selection of the one or more resources from the at least one resource pool comprises selecting multiple resources from the at least one resource pool; and
the transmission comprises at least one of:
repeating the CLI-RS on the multiple resources,
transmitting the CLI-RS via different transmit ports on the multiple resources, or
transmitting the CLI-RS using different transmit power levels on the multiple resources.

2. The apparatus of claim 1, wherein the plurality of resources are continuous in time and frequency.

3. The apparatus of claim 1, wherein at least one of:
the at least one resource pool is periodic; or
the resource pool is configured with at least one of a period or an offset.

4. The apparatus of claim 1, wherein the one or more resources are selected from different resource pools of the at least one resource pool and at different times.

5. The apparatus of claim 1, wherein the selection of the one or more resources from the at least one resource pool comprises selecting at least one of: one or more symbols, a frequency comb interlace, or a code.

6. The apparatus of claim 1, wherein the transmission comprises transmitting the one or more CLI-RS on the one or more resources.

7. The apparatus of claim 1, wherein:
each of the one or more CLI-RS is transmitted as a sounding reference signal (SRS) waveform; or
the monitoring comprises monitoring for an SRS waveform as the one or more CLI-RS.

8. The apparatus of claim 1, wherein the one or more processors are further configured to execute the computer-executable instructions to cause the apparatus to receive, via the at least one transceiver, signaling indicating the one or more resources from the at least one resource pool, wherein the selection of the one or more resources from the at least one resource pool comprises selecting the indicated one or more resources from the at least one resource pool.

9. The apparatus of claim 8, wherein the signaling further indicates at least one of: one or more symbols, one or more frequency comb interlaces, one or more code index, or one or one or more cyclic shift index from the at least one resource pool.

10. The apparatus of claim 1, wherein the one or more processors are further configured to execute the computer-executable instructions to cause the apparatus to receive, via the at least one transceiver, signaling configuring the apparatus with a resource hopping pattern, wherein transmitting or monitoring comprises hopping resources for transmitting or monitoring for the one or more CLI-RS.

11. The apparatus of claim 1, wherein the selection of the one or more resources from the at least one resource pool comprises selecting the one or more resources from the at least one resource pool based on a resource selection pattern.

12. The apparatus of claim 11, wherein the selection of the one or more resources from the at least one resource pool based on the configured resource selection pattern comprises randomly selecting the one or more resources from the at least one resource pool based on a seed.

13. The apparatus of claim 11, wherein the one or more processors are further configured to execute the computer-executable instructions to cause the apparatus to:

receive, via the at least one transceiver, signaling indicating the resource selection pattern for selecting the one or more resources from the at least one resource pool.

14. The apparatus of claim 1, wherein the one or more processors are further configured to execute the computer-executable instructions to cause the apparatus to receive, via the at least one transceiver, signaling indicating a subset of the plurality of resources of the at least one resource pool, wherein the one or more resources are selected from the subset of resources.

15. The apparatus of claim 1, the selection comprises:

randomly selecting the one or more resources from the at least one resource pool; or selecting the one or more resources from the at least one resource pool based on a preference of the apparatus.

16. The apparatus of claim 1, wherein the selection of the one or more resources from the at least one resource pool comprises selecting first one or more resources from a first resource pool for transmitting or monitoring for first one or more CLI-RS and selecting second one or more resources from a second resource pool for transmitting or monitoring for second one or more CLI-RS, the second resource pool being different from the first resource pool.

17. The apparatus of claim 1, wherein the transmission or the monitoring comprises monitoring the one or more CLI-RS on the one or more resources.

18. The apparatus of claim 17, wherein the one or more processors are further configured to execute the computer-executable instructions to cause the apparatus to:

measure the one or more CLI-RS; and report, to a network entity via the at least one transceiver, the one or more measurements.

19. The apparatus of claim 18, wherein the report comprises only measurements of a dominant interferer to the network entity.

20. The apparatus of claim 1, wherein the selection of the one or more resources from the at least one resource pool comprises:

selecting a first one or more resources from the at least one resource pool for transmitting first one or more CLI-RS; and selecting a second one or more resources from the at least one resource pool for monitoring for second one or more CLI-RS.

21. The apparatus of claim 20, wherein the one or more processors are further configured to execute the computer-executable instructions to cause the apparatus to monitor, via the at least one transceiver, for the second one or more CLI-RS in resources of the first one or more resources unused by the UE for transmitting the first one or more CLI-RS.

22. The apparatus of claim 21, wherein the first one or more resources and the second one or more resources overlap, further comprising determining to use the overlapping resources for transmitting or for monitoring CLI-RS based on a priority or a rule.

23. The apparatus of claim 22, wherein the determination to use the overlapping resources for transmitting CLI-RS or for monitoring CLI-RS based on the priority comprises prioritizing resources configured by a network entity for transmitting or monitoring for CLI-RS over resources decided by the UE for transmitting or monitoring CLI-RS.

24. The apparatus of claim 1, wherein the apparatus is configured to operate as a user equipment (UE).

25. A method for wireless communication by a user equipment (UE), the method comprising:

selecting one or more resources from at least one resource pool comprising a plurality of resources for cross-link interference (CLI) reference signals (RS); and transmitting or monitoring for one or more CLI-RS on the one or more resources, wherein:

the selection of the one or more resources from the at least one resource pool comprises selecting multiple resources from the at least one resource pool; and the transmission comprises at least one of:

repeating the CLI-RS on the multiple resources, transmitting the CLI-RS via different transmit ports on the multiple resources, or transmitting the CLI-RS using different transmit power levels on the multiple resources.

26. An apparatus for wireless communication, comprising:

at least one transceiver;

at least one memory comprising computer-executable instructions; and one or more processors configured to execute the computer-executable instructions to cause the apparatus to:

configure one or more user equipments (UEs) with at least one resource pool comprising a plurality of resources for at least one of: transmitting or monitoring for one or more cross-link interference (CLI) reference signals (RS); and receive, via the at least one transceiver, a CLI measurement report from at least one of the one or more UEs, wherein:

the configuration configures the one or more UEs to select multiple resources from the at least one resource pool for at least one of: repeating the CLI-RS on the multiple resources, transmitting the CLI-RS via different transmit ports on the multiple resources, or transmitting the CLI-RS using different transmit power levels on the multiple resources.

27. The apparatus of claim 26, wherein the plurality of resources are continuous in time and frequency.

28. The apparatus of claim 26, wherein at least one of:

the at least one resource pool is periodic; or the resource pool is configured with at least one of a period or an offset.

29. The apparatus of claim 26, wherein the apparatus is configured to operate as a network entity.

* * * * *